M. W. W. MACKIE.
DYNAMO ELECTRIC MACHINE.
APPLICATION FILED JULY 24, 1907.
909,197.
Patented Jan. 12, 1909.
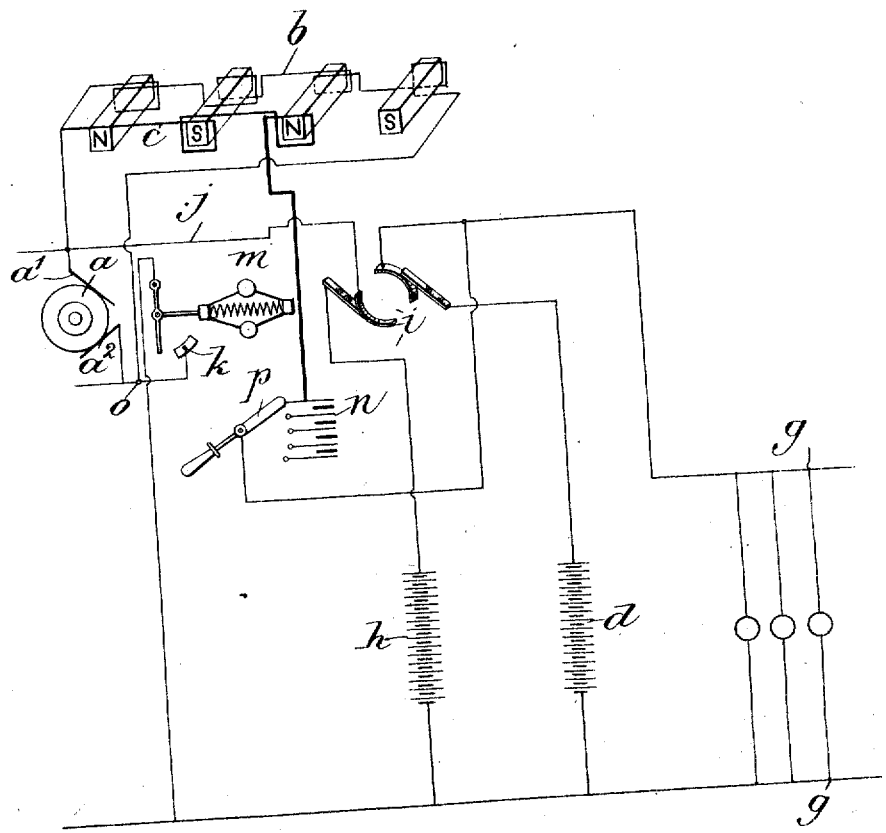
Witnesses
Drew Leftowitz
B. S. Tischner
Inventor
Matthew William Walbank Mackie
By Townsend & Decker
Attorneys.

UNITED STATES PATENT OFFICE.

MATTHEW WILLIAM WALBANK MACKIE, OF EALING, ENGLAND.

DYNAMO-ELECTRIC MACHINE.

No. 909,197.   Specification of Letters Patent.   Patented Jan. 12, 1909.

Application filed July 24, 1907. Serial No. 385,247.

*To all whom it may concern:*

Be it known that I, MATTHEW WILLIAM WALBANK MACKIE, a subject of the King of Great Britain and Ireland, residing at Ealing, in the county of Middlesex, England, have invented Improvements in or Connected with Dynamo-Electric Machines, of which the following is a specification.

This invention has reference to improvements in or connected with electric supply systems wherein a constant or practically constant electromotive force is maintained between the terminals of a multipolar dynamo electric machine by varying the strength of the field magnet poles, or some of them, by a demagnetizing winding, upon variation in the speed of the machine from a predetermined speed corresponding to normal voltage. One arrangement for this purpose is described in the specification of another application for Letters Patent filed by me dated 24th August 1906, Serial No. 331830, according to which some of the poles of the machine in addition to their ordinary shunt winding are provided with a reversely acting main or demagnetizing winding and the flow of current through such winding is controlled in such a manner that upon variation of speed of the machine from normal speed, corresponding to normal voltage, but not until then, current will be caused to flow through the main winding and vary the strength of the field magnet poles upon which such winding is arranged, in such a manner as to maintain the electro-motive force at the terminals of the machine practically constant. For controlling the flow of current through the main winding, the electro-motive force therein is opposed by a counter electro-motive force produced by a secondary battery in such a manner that at a predetermined speed of the machine, corresponding to normal voltage, no or practically no current will flow through the main winding but upon increase of speed and consequent increase in the electro-motive force of the machine, current will be caused to flow through the main winding in opposition to the counter electro-motive force of the secondary battery and more or less demagnetize the magnet poles upon which the winding is placed so as to thereby reduce the electromotive force of the machine to about the normal amount, the said secondary battery being in some cases arranged to simultaneously supply a work circuit to which it is connected, or to act as a reserve source of supply therefor, if such circuit is to be normally supplied by the dynamo by connecting it across the brushes thereof, and further is adapted to be interchanged at will, if desired, with another secondary battery arranged to be charged in another work circuit directly supplied by the dynamo while the first named secondary battery is in use for the purpose described.

Now according to the present invention in order that the action of the main or demagnetizing winding between one brush of the machine and the second or regulating secondary battery used for opposing the flow of current through such winding may be readily adjusted so as to obtain any desired voltage across the brushes of the dynamo machine to suit different working conditions, as for example to adapt the machine for use with different types of secondary batteries, without for this purpose having to alter or vary the construction of the winding, I provide in the circuit between the one end of the said main winding and the secondary battery connected thereto, a device such for example as a plurality of cells containing lead plates dipping into dilute sulfuric acid, or a supplementary set of secondary cells having no storage capacity or practically no storage capacity so that in either case the E. M. F. of such cells added to that of the secondary battery connected to the said winding and opposing the flow of current through the main or demagnetizing winding together with the E. M. F. necessary to overcome the resistance of the demagnetizing winding and pass the maximum regulating current through the said demagnetizing winding, shall equal the E. M. F. required to charge the other secondary battery connected across the brushes of the machine, and in connection with such device I provide means, such as a switch, whereby the amount of the counter electromotive force opposed to the total electromotive force of the machine by such device can be readily varied to suit different requirements.

By the means described, the main winding can be made of small ohmic resistance so that it can be caused to act in the required manner with any required predetermined difference of potential between its ends, and the difference of potential between the terminals of the machine above the normal difference at which the regulating action of the main winding will commence, can be made variable and as small as required, say about two volts, so as to suit the particular secondary batteries in use.

The invention is specially applicable in connection with dynamo-electric apparatus of the kind referred to for train lighting but is also applicable in cases where motors, or other translating devices are to be used in the circuit supplied by the dynamo and, it may be, by the secondary battery.

The accompanying drawing illustrates diagrammatically one application of the invention, $a$ being the dynamo or generator, $b$ the shunt winding of the field magnet, $c$ the demagnetizing winding, $d$ the secondary battery supplying the work circuit $g$ and the E. M. F of which opposes the E. M. F. of the dynamo through the winding $c$, $h$ the secondary battery which is connected across the brushes $a^1$, $a^2$ of the generator $a$ during charging and is adapted to be interchanged with the secondary battery $d$, $i$ the battery interchanging switch, and $k$ an automatic cut-out controlled by a centrifugal governor $m$ for opening the dynamo circuit when the speed of the armature falls below that necessary for supplying the voltage necessary for charging the secondary battery $h$, $n$ is the supplementary set of secondary cells employed according to this invention, and $p$ a switch for cutting one or more of the said cells $n$ into and out of circuit as required.

As will be understood, with a demagnetizing winding $c$ of a given resistance, a certain difference of potential must exist between its opposite ends before current can flow therethrough. This winding further, to be effective, must be such that it will produce the desired regulating effect rapidly, as soon as the aforesaid difference of potential is but slightly exceeded. Therefore, in order that an excessive difference of potential shall not exist between the brushes of the machine for a given dynamo speed when the secondary batteries $d$ and $h$ for use therewith are replaced by secondary batteries of lower voltage, the secondary cells $n$, or one or some of them can be switched out of circuit to enable the voltage between the brushes $a^1$, $a^2$ to be reduced and at the same time insure that the predetermined difference of potential at the terminals of the demagnetizing winding $c$ for regulating purposes shall not be altered. Similarly, when secondary batteries of greater voltage are to be used in lieu of batteries of less voltage, one or more of the supplementary cells $n$, or one or more additional cells, are put in circuit with the said winding. In this way the machine is enabled to supply the independent work circuit $j$ including the secondary battery to be charged, directly with current at the required constant voltage.

It is to be understood that the invention may be used with a demagnetizing winding on some only or all of the poles of the field magnet of a dynamo electric machine.

What I claim is:—

1. In an electric supply system wherein the voltage of a dynamo is maintained practically constant by a demagnetizing winding and a secondary battery opposing the flow of current therethrough, the combination with the demagnetizing winding and secondary battery arranged in series with each other between the brushes of the dynamo of means adapted to supplement the E. M. F. of the said secondary battery and whereby the voltage of the dynamo can be altered without altering the demagnetizing winding.

2. In an electric supply system wherein the voltage of a dynamo is maintained practically constant by a demagnetizing winding and a secondary battery opposing the flow of current therethrough, the combination with the demagnetizing winding and secondary battery arranged in series with each other between the brushes of the dynamo, of a supplementary set of cells the E. M. F. of which can be added to that of the regulating secondary battery.

3. In an electric supply system wherein the voltage of a dynamo is maintained practically constant by a demagnetizing winding and a secondary battery opposing the flow of current therethrough, the combination with the demagnetizing winding and secondary battery arranged in series with each other between the brushes of the dynamo, of a supplementary set of electric cells the E. M. F. of which can be added in whole or in part to that of the regulating secondary battery.

4. In an electric supply system wherein the voltage of a shunt wound dynamo is maintained practically constant by a demagnetizing winding and a secondary battery opposing the flow of current therethrough, the combination with the demagnetizing winding and secondary battery arranged in series with each other between the brushes of the dynamo, of a supplementary set of electric cells and means whereby one or more of the same can be cut into and out of the circuit of the said demagnetizing winding and secondary battery at will.

5. In an electric supply system wherein the voltage of a shunt wound multipolar dynamo is maintained practically constant by a demagnetizing winding and a secondary battery opposing the flow of current therethrough, the combination with the demagnetizing winding and secondary battery arranged in series with each other between the brushes of the dynamo, of a supplementary set of electric cells, and a switch adapted to cut said cells into and out of circuit with said demagnetizing winding and secondary battery in any required order.

6. In an electric supply system wherein the voltage of a dynamo is maintained practically constant by a demagnetizing winding and a secondary battery opposing the flow of current therethrough, the combination with the demagnetizing winding and secondary battery arranged in series with each other between the brushes of the dynamo, of a supplementary set of secondary cells of no or practically no capacity, and means whereby one or more of the same can be cut into and out of circuit at will with said demagnetizing winding and secondary battery.

7. In an electric supply system wherein the voltage of a dynamo is maintained practically constant by a demagnetizing winding and a secondary battery opposing the flow of current therethrough, the combination with the demagnetizing winding and secondary battery arranged in series with each other between the brushes of the dynamo, of a supplementary set of secondary cells of no or practically no capacity and a switch adapted to cut said cells into and out of circuit with said demagnetizing winding and secondary battery in any required order.

8. In an electric supply system wherein the voltage of a shunt wound dynamo is maintained practically constant by a demagnetizing winding and a secondary battery opposing the flow of current therethrough, the combination with the demagnetizing winding and secondary battery arranged in series with each other between the brushes of the dynamo of a supplementary set of cells, the voltage of each of which is equal to the individual increments or decrements of voltage required at the brushes of the dynamo, said cells being arranged to be placed in series with said demagnetizing winding and secondary battery.

9. In an electric supply system wherein the voltage of a shunt wound dynamo is maintained practically constant by a demagnetizing winding and a secondary battery opposing the flow of current therethrough, the combination with the demagnetizing winding and secondary battery arranged in series with each other between the brushes of the dynamo of a supplementary set of secondary cells of no or practically no capacity, the voltage of each of which is equal to the individual increments or decrements of voltage required at the brushes of the dynamo, said cells being arranged to be placed in series with the said demagnetizing winding and secondary battery.

10. In an electric supply system wherein the voltage of a shunt wound multipolar dynamo is maintained practically constant by a demagnetizing winding on some of its poles and a secondary battery opposing the flow of current therethrough, the combination with the demagnetizing winding, the secondary battery arranged in series with each other between the brushes of the dynamo, and a distributing system connected to the terminals of said secondary battery, of a supplementary set of secondary cells arranged between the secondary battery and demagnetizing winding so as to assist the action of the secondary battery, and a switch device whereby one or more of the supplementary cells can be put in and out of action.

Signed at London England this 28th day of June 1907.

MATTHEW WILLIAM WALBANK MACKIE.

Witnesses:
H. D. JAMESON,
F. L. RAND.